United States Patent [19]

Stobbe et al.

[11] Patent Number: 4,899,132
[45] Date of Patent: Feb. 6, 1990

[54] MOTION SENSOR

[75] Inventors: Anatoli Stobbe, Berliner Strasse 5e, D-3000 Hanover; Wilfried Herrmann, Gehrden, both of Fed. Rep. of Germany

[73] Assignee: Anatoli Stobbe, Hanover, Fed. Rep. of Germany

[21] Appl. No.: 180,186

[22] Filed: Apr. 11, 1988

[30] Foreign Application Priority Data

Apr. 22, 1987 [DE] Fed. Rep. of Germany ....... 3713416

[51] Int. Cl.$^4$ .......................... G08B 13/24; G01C 9/06
[52] U.S. Cl. ...................................... 340/551; 33/366; 340/689
[58] Field of Search .............................. 340/551, 689; 200/DIG. 29, 61.45 R; 33/366

[56] References Cited

U.S. PATENT DOCUMENTS 4,587,741  5/1986  Rorden et al. ........................ 33/366

Primary Examiner—Glen R. Swann, III
Assistant Examiner—Thomas J. Mullen, Jr.
Attorney, Agent, or Firm—Collard, Roe & Galgano

[57] ABSTRACT

A motion sensor is provided having within a casing a resonant element with a magnet arranged therebeneath and a freely movable ball made from magnetizable material disposed there above. A change in the position of the ball causes a change in the density of the flow of the magnetic lines of force and as a result, a resonance voltage is produced in the resonant element thereby indicating motion. As the motion is detected by electronic means, high sensitivity is assured, and such sensitivity, furthermore, can be adjusted by simple means as required in a given case of application.

15 Claims, 2 Drawing Sheets

MOTION SENSOR

The present invention relates to a motion sensor for generating a signal or plurality of signals when the motion sensor is subjected to movement.

Motion sensors of the above type are used for the personal protection of security personnel and also as alarm systems for protecting or securing buildings against burglary. In the possible applications of motion sensors, the common feature is that such sensors generate and emit signals if the motion sensor is subjected to movement, i.e., if the resting position thereof changes.

In the field of building protection, security personnel in many cases are now equipped with emitters for the wireless transmission of signals, and it is customary to attach to the emitter a motion sensor. The motion sensor generates signals as long as the person is in motion. If, on the other hand, no signals are emitted by the motion sensor, such silence may suggest a cause for alarm, for example if the person is lying unconscious or incapacitated. The emittance of an emergency call via the emitter is intended for such a case. Conversely, if a motion sensor is used to protect a building against burglary, a signal can be generated and emitted if the burglar enters a room and the motion sensor registers the movement.

The real life applications described above by way of example, readily illustrate the great importance attached to the motion sensor. However, the motion-sensing device of the prior art are nevertheless still afflicted with serious drawbacks. With such prior art motion sensors, the signal is generated by mechanical contacts which are closed by mechanical force when a motion occurs, whereby a signal is generated. However, the drawback with such a system is that the response sensitivity is relatively high because a mechanical force must be applied in order to generate the signal or for closing the electrical contact. In addition, such motion sensors, because of their susceptible mechanics, are not always reliable in operation.

It is, therefore, an object of the present invention to provide a motion sensor having high reliability and low response sensitivity and with a simple and compact structure.

The above object is accomplished in accordance with the present invention by the provision of a motion sensor which generates a signal or a plurality of signals when a motion acts thereon. The sensor includes means for generating a magnetic field, a freely movable body formed of magnetizable material, and a detector which responds to changes in the magnetic field.

Thus, in accordance with the present invention, the use of mechanical contacts in motion sensors is dispensed with since the basic premise of the invention is to exploit the change in the lines of force of a magnetic field when a movement acts on the motion sensor to thereby generate a signal.

In a useful embodiment of the present invention, provision is made for a resonant element with a magnet associated therewith, as well as for a freely movable ball made from a magnetizable material. From the magnet, the lines of magnetic force extend to the freely movable ball. If motion of the freely movable ball is induced by external forces, the change in the magnetic lines of force or in their density so effected by the movement, causes the resonant element to generate a voltage which can be amplified by means of an amplifier. Consequently, with the exception of the negligible frictional force of the freely moving ball, no mechanical forces need be applied for the generation of the signal, so that the novel motion sensor has an extremely high sensitivity.

Another advantage of the motion sensor according to the present invention lies in the fact that its sensitivity can be varied as desired by changing the degree of amplification of the amplifier to thereby adapt the motion sensor to the particular application.

The use of a resonant element in the inventive motion sensor, allows for a very compact structure for the complete motion sensor, so that the spatial requirement thereof is extremely small thereby permitting the mounting of the sensor on an existing emitter or the like. Dimensions of about 10 mm × 8 mm can be realized for the motion sensor with the casing surrounding it.

In another preferred embodiment of the motion sensor according to the present invention, the ball is suspended within the casing on a hook in the manner of a pendulum, at a small distance or space above the resonant element. With this embodiment, the response sensitivity may be additionally changed by varying the distance of the ball from the resonant element, and, furthermore, a very high sensitivity is effected by the pendulum-like suspension of the ball.

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

Figure 1:
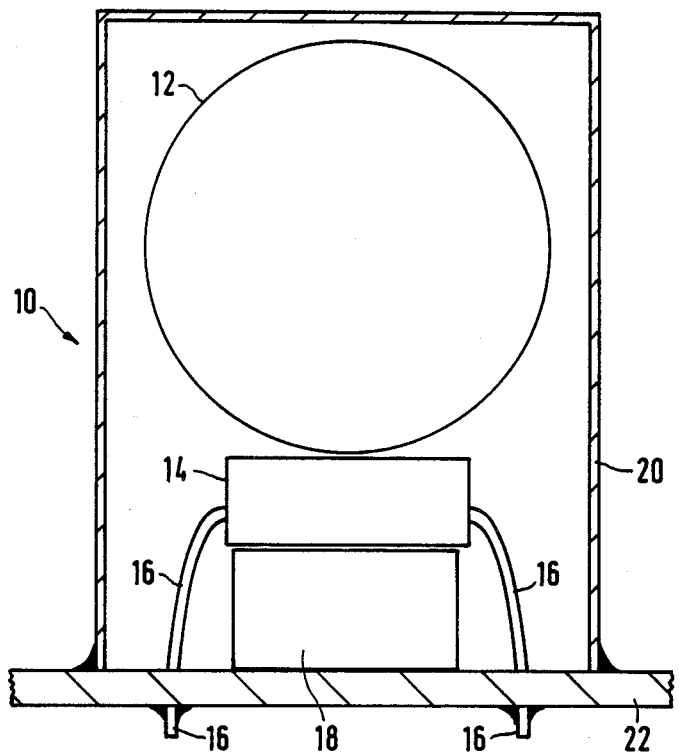
FIG. 1 is a schematic view of an embodiment of a motion sensor according to the present invention.

Now turning to the drawings, a motion sensor 10, according to the first embodiment, is shown in FIG. 1. Motion sensor 10 is encased by a closed casing 20, which is sealed at the bottom by a plate bar 22. A resonant element 14 is fastened to plate bar 22 by means of outwardly leading connection elements 16 and a magnet 18 is disposed on plate bar 22 beneath resonant element 14. Furthermore, a freely movable ball 12, formed of a magnetic material, is disposed within casing 20 above resonant element 14. Magnetic lines of force are formed between magnet 18 and ball 20 which extend through resonant element 14 and close both within casing 20 and outside the latter.

As long as ball 12 remains in a rest position, no change takes place in the magnetic lines of force or in their density. However, if ball 12 moves into a different position as a result of a motion or movement acting on motion sensor 10 from the outside, the density of the magnetic lines of force changes, entailing the generation of a voltage within resonant element 14.

The above description of motion sensor 10 illustrates the important new function, its novelty being that the motion of ball 12 within casing 20 is not registered by mechanical contacts but measured contactlessly by resonant element 14.

The mass of ball 12 concentrates the density in the flow of the magnetic lines of force by means of resonant element 14 and the magnetic flow effects in resonant element 14 the occurrence of the so-called resonance voltage. If the position of the mass of ball 12 changes, the resonance voltage changes too, which voltage may be supplied to an amplifier as explained in greater detail hereinafter by reference to FIG. 3.

Figure 2:
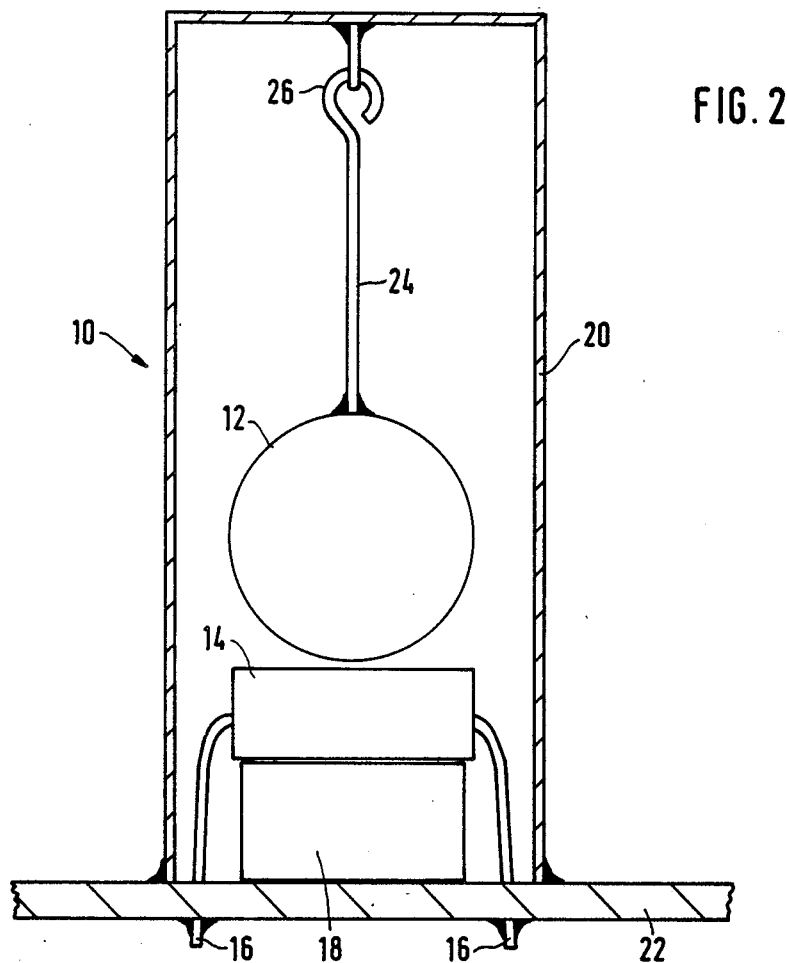
FIG. 2 is a schematic view of another embodiment of a motion sensor according to the present invention.

In the second embodiment shown in FIG. 2, a motion sensor 10′ includes a ball 12′ suspended on a hook 26 at the top end of casing 20′ by way of a pendulum 24. Ball 12′ is disposed at a distance above resonant element 14′. This arrangement leads to a particularly high response sensitivity of motion sensor 10′, as the ball 12′ is caused to move even in the presence of the slightest vibrations, which then generates a voltage in resonant element 14′. The response sensitivity may be additionally varied in that it is possible to vary the distance between ball 12′ and resonant element 14′.

Both with the motion sensor according to FIG. 1 and the one according to FIG. 2, the casing has a round or cylindrical shape. Therefore, as long as motion sensor 10 or 10′ is in its vertical position as shown, axial rotations of casing 20 or 20′ have no bearing on response sensitivity since ball 12 or 12′ is confined by the round cylindrical walls of the casing in any case.

If, on the other hand, motion sensor 10′ according to FIG. 2 is disposed in a lying or horizontal position (for example if the person carrying the motion sensor is lying on the floor), motion sensor 10′ has a lower response sensitivity, which is intentionally selected for such a case and entirely desirable.

Figure 3:
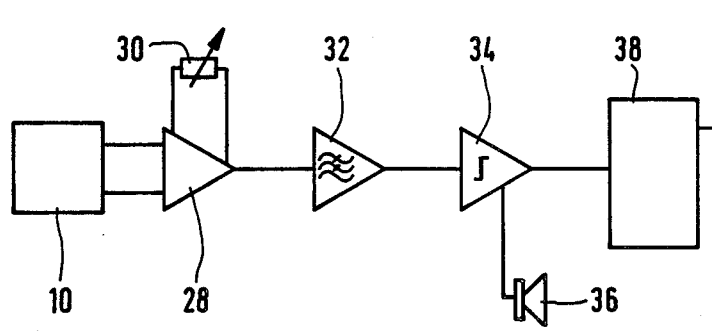
FIG. 3 is a basic circuit diagram of a circuit arrangement connected downstream of the motion sensor.

FIG. 3 shows that the voltage generated by resonant element 14 or 14′ of motion sensor 10 or 10′, respectively, is amplified in an amplifier 28, wherein the degree of amplication is adjustable with a resistor 30 to thereby permit sensitivity adjustment.

Figure 4:
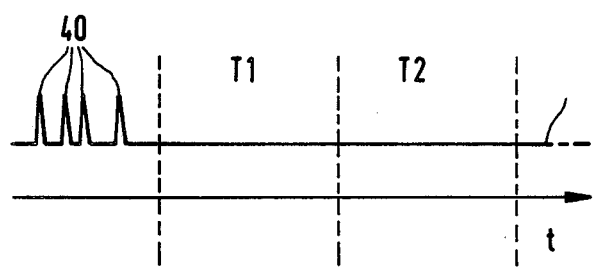
FIG. 4 is a graphical representation of the signals and time stages of a motion sensor according to the present invention.

As hum pick-up may occur due to high sensitivity, such pick-up will be suppressed by a low pass filter 32, which is connected downstream from amplifier 28, and which has a limit frequency of about 5 to 7 Hertz. Low pass filter 32 is followed by a switching stage 34, in which the relatively slow signals 40 (cf. FIG. 4) are shaped into steep-sloped digital signals. Switching stage 34 is connected to a stationary loud speaker 36 for producing a stationary preliminary alarm, as well as to an emitter 38 for emitting an emergency call.

The mode of operation of the circuit arrangement described above is illustrated in FIG. 4, which shows signal 40 lengthwise, such signal being generated in the presence of motion. The time stage T1 characterizes a waiting period within switching stage 34. If no signal 40 is produced within the waiting period of 10 to 60 seconds, time stage T1 is followed by another time stage T2, and a stationary preliminary alarm is now produced via loudspeaker 36. This preliminary alarm alerts the person carrying motion sensor 10 to the fact that in the continuing absence of signal 40, an emergency call will be emitted via emitter 38, and that he or she has to move on, continuing, for example an inspection round. If, however, no further motion takes place, that is, if time stage T2 ("preliminary alarm") expires without any occurrence or appearance of signal 40, an emergency call is automatically emitted via emitter 38.

The above description illustrates the beneficial application of the novel motion sensor in the field of personal protection, even though other cases of application are, of course, feasible.

The important feature that must be emphasized is the fact that with the novel motion sensor, a motion is detected by purely electronic means, which, furthermore, permits sensitivity adjustment by simple means. This is not possible with conventional motion sensors operating with normal spherical switches with electrical or mechanical contacts.

With the present invention, sensitivity is additionally influenced by the shape selected for the casing. Instead of the cylindrical form of casing, it is possible to use, for example a rectangular, squared shape, in which case the sensitivity, for example with the motion sensor according to FIG. 1, depends on whether the ball 12 rolls against a plane lateral wall, or is moved into a corner when the position of the motion sensor 10 changes.

While two embodiments of the present invention have been shown and described, it will be obvious that many changes and modifications may be made thereunto without departing from the spirit and scope of the invention.

What is claimed is:

1. A motion sensor for the generation of a signal or a plurality of signals in the presence of a motion acting on the motion sensor, the motion sensor comprising a freely movable body formed of magnetizable material, and a detector comprising a resonant element which responds to changes in a magnetic field.

2. The motion sensor as defined in claim 1, which further comprises means for generating a magnetic field.

3. The motion sensor as defined in claim 1, which further comprises a magnet associated with the resonant element.

4. The motion sensor as defined in claim 3, wherein said magnet is arranged beneath the resonant element, and the freely movable body is disposed above the resonant element.

5. The motion sensor as defined in claim 4, wherein said freely movable body has the shape of a ball.

6. The motion sensor as defined in claim 3, wherein said freely movable body, said resonant element and said magnet are disposed within a casing, said casing being closed on all sides and having a plate bar at the bottom, said resonant element being fastened on the plate bar with two outwardly leading connection elements.

7. The motion sensor as defined in claim 6, wherein said freely movable body is suspended within said casing on a hook with a spacing from said resonant element.

8. The motion sensor is defined in claim 7, wherein the spacing between said movable body and said resonant element is variable.

9. The motion sensor as defined in claim 8, wherein the voltage produced by said resonant element is supplied to an amplifier having adjustable amplification.

10. The motion sensor as defined in claim 9, wherein a low pass filter and a switching stage are connected downstream from said amplifier, and the output of said switching stage is connected to an emitter.

11. The motion sensor as defined in claim 9, wherein the limit frequency of said low pass filter is about 5 to 7 Hertz.

12. The motion sensor as defined in claim 9, wherein said switching stage produces different time stages and is connected to a preliminary alarm-sending device.

13. The motion sensor as defined in claim 12, wherein said time stages are activatable in the absence of a signal from said resonant element in order to produce a preliminary alarm or to induce the emittance of an emergency call via the emitter.

14. The motion sensor as defined in claim 6, wherein said casing has a cylindrical shape.

15. The motion sensor as defined in claim 6, wherein said casing has a square shape.

* * * * *